Nov. 18, 1941.     L. E. STEWART     2,263,525
OVERLOAD SPRING
Filed Dec. 30, 1940

INVENTOR.
Leslie E. Stewart
BY
ATTORNEYS.

Patented Nov. 18, 1941

2,263,525

UNITED STATES PATENT OFFICE 2,263,525

OVERLOAD SPRING

Leslie E. Stewart, Parker, Ind.

Application December 30, 1940, Serial No. 372,399

1 Claim. (Cl. 267—28)

This invention relates to improvements in supporting spring constructions particularly well adapted for use as an overload spring for automotive and other vehicles.

The primary object of this invention is the provision of a spring construction for automobiles and like vehicles which embodies a relatively simple and practical arrangement for auxiliary support of the load upon the frame of the vehicle; the same being relatively detachable from the vehicle and including means to facilitate its attachment between the frame of the vehicle and a spring or axle.

A further object of this invention is the provision of an overload compression unit for vehicles, which includes an improved telescoping housing assemblage for a compression coil spring, and improved means to limit the extent of relative movement of the parts of the housing under action of the spring.

Other objects and advantages of this invention will be apparent during the course of the following detailed description.

In the accompanying drawing, forming a part of this specification, and wherein similar reference characters designate the corresponding parts throughout the several views, Figure 1 is a side elevation of a portion of the chassis of an automobile, showing the frame, spring, axle and wheel assemblage, and the improved overload compression unit attached therewith.

Figure 1:
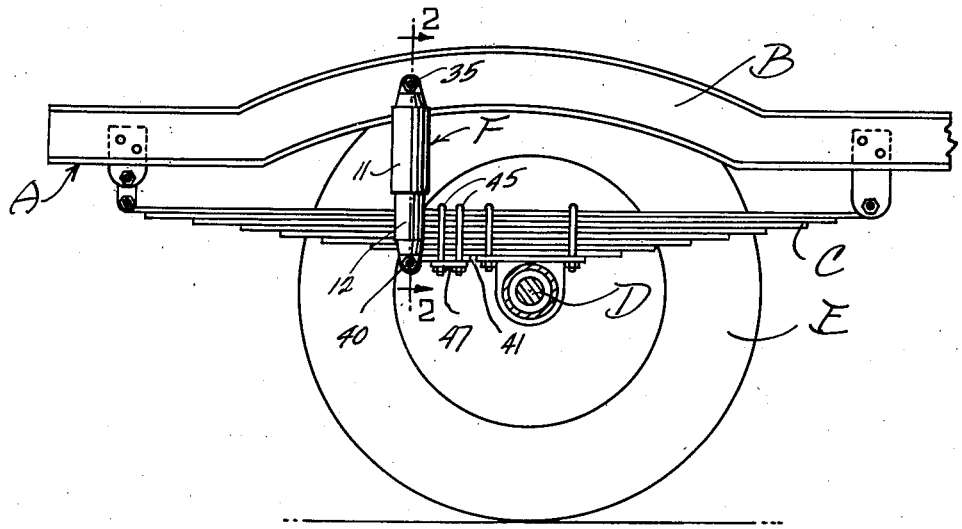

In the drawing, wherein for the purpose of illustration is shown only a preferred embodiment of the invention, the letter A may generally designate a vehicle, which may include a frame B, conventional, semi-elliptic spring C, axle D and supporting wheel E. The improved overload compression unit F is associated between the frame B and spring C in the relation shown in Figure 1.

Referring to the improved overload compression unit F, the same includes a housing, which may be generally designated at 10, consisting of telescoping tubes or sleeves 11 and 12. The upper sleeve 11 is provided with a conical shaped head piece 13 detachably connected in the upper end of the sleeve 11 and held therein as by a screw 14. The lower sleeve or housing part 12, which telescopes within the sleeve 11 is similarly provided with an end or head piece 15, of conical formation, held in the lower end of the sleeve 12 by means of a screw 16. These end pieces 13 and 15 are detachable from their respective housing parts.

Figure 2:
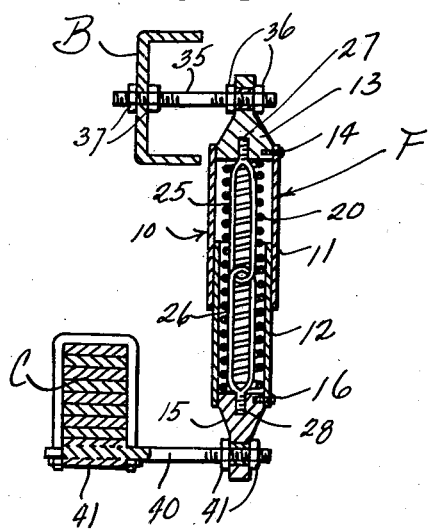
Figure 2 is a vertical cross-sectional view showing the improved overload spring in its relation to a side of the frame of the vehicle and one of the main supporting springs of the vehicle.
Figure 3:
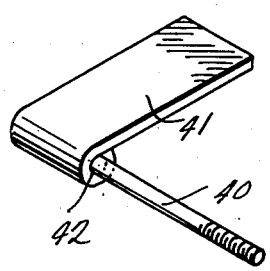
Figure 3 is a perspective view of a bracket assemblage used in connection with the overload compression unit.

The telescopically related sleeves 11 and 12 house therein the main compression spring 20, which is of the coil spring variety. Springs of different sizes and compressibility may be provided, as can readily be understood. Relatively movable inter-connected links 25 and 26 are disposed within the passageway formed by the coil spring 20, and are respectively detachably connected at screw threaded ends 27 and 28 to the housing ends or heads 13 and 15 of the housing assemblage. The loops formed by these links 25 and 26 each extend from about midway of the length of the housing to the point of connection with the respective heads 13 and 15, as is shown in Figure 2 of the drawing. These links limit the extent to which the spring can extend the housing, and compression of the spring is limited to a little more than the length of one of these links, as is readily apparent. With this arrangement of limiting the rebound, it is not necessary to place any external limiting springs, nuts or parts, since the details can readily be assembled due to the detachable arrangement of the ends of the housing sleeve.

The housing head 13 is preferably transversely apertured and detachably supports a bracket rod 35, as by means of nuts 36 which are secured on the bracket rod at opposite sides of the apertured boss provided at the extreme outer end of the head 13. The outer end of the bracket rod 35 is screw-threaded and adapted to be attached by nuts 37 to the frame B, or any other part of the chassis of the automobile found best suited to support the overload spring.

The boss end of the housing head 15 is similarly provided with an aperture to detachably receive a bracket rod 40, which is bolted in the opening of this head 15 by means of nuts 41, as shown in Figure 2. Both of the bracket rods 35 and 40 extend in right angled relation to the axis of the overload spring housing. An important feature of the invention is the facility with which the lower end of the overload spring assemblage may be attached to a spring, axle or other part of an automobile. This arrangement consists of providing the outer end of the bracket rod 40 with a hanger strap 41, which is flat, and may be welded at 42 to the rod 40.

The strap 41 is disposed in right angled relation to the rod 40 and is of a nature to be disposed against a leaf of the semi-elliptic spring C and secured thereto by means of U-shaped bolts 45, as shown in Figure 1 of the drawing. These bolts 45 clamp the hanger strap 41 against the spring by means of an attaching strap 47. The hanger strap 41, in case the automotive vehicle is provided with main coil springs for supporting the load may abut against the lower seat of the main coil spring and be secured similar to the showing in Figure 1 of the drawing.

From the foregoing description of this invention, it is apparent that an overload coil spring has been provided, the parts of which may be easily reached. The entire arrangement may be easily attached or detached to or from the parts of a vehicle. The assemblage is such that the carrying capacity of the overload springs can be varied. In addition, the housing is completely enclosed and the action of the spring is entirely silent.

Various changes in the shape, size and arrangement of parts may be made to the form of the invention herein shown and described, without departing from the spirit of the invention or the scope of the claim.

I claim:

In an overload compression spring assemblage for vehicles, the combination of telescoping sleeves defining a spring housing, a coil spring in the housing under compression therein, detachable heads at the outer ends of each of said sleeves connected to the sleeves, slidably interconnected links for limiting the expansive movement of said spring, one being connected to the head of one sleeve and the other being connected to the head of the other sleeve, said connections being socketed in said heads entirely within the heads without any external projection thereof, and means at the extreme ends of said heads for detachable connection with vehicle parts for shock absorbing purposes.

LESLIE E. STEWART.